United States Patent [19]

Eccardt et al.

[11] Patent Number: 4,599,927
[45] Date of Patent: Jul. 15, 1986

[54] TOOL ELEVATION AND BEVEL ADJUSTMENT FOR DIRECT DRIVE POWER TOOL

[75] Inventors: Curtis J. Eccardt, County of St. Charles; Arnold L. Smith, County of St. Louis, both of Mo.

[73] Assignee: Emerson Electric Co., St. Louis, Mo.

[21] Appl. No.: 731,732

[22] Filed: May 8, 1985

[51] Int. Cl.⁴ .......................... B27B 5/24; B26D 1/14
[52] U.S. Cl. ..................... 83/473; 83/477.1; 83/477.2
[58] Field of Search ............ 83/473, 477.1, 477.2, 83/471.3, 574, 432, 581; 51/166 TS; 144/130

[56] References Cited

U.S. PATENT DOCUMENTS

| | | | |
|---|---|---|---|
| 96,224 | 10/1869 | Grosvenor | 83/473 |
| 1,821,113 | 9/1931 | Neighbor | 83/473 |
| 2,652,863 | 9/1953 | Grabinski | 83/473 |
| 4,249,442 | 2/1981 | Fittery | 83/473 |

Primary Examiner—E. R. Kazenske
Assistant Examiner—John L. Knoble
Attorney, Agent, or Firm—Polster, Polster and Lucchesi

[57] ABSTRACT

A tool elevation and bevel adjustment machanism for a direct drive power tool (e.g., a direct drive table saw) is disclosed in which the power tool's drive motor is mounted on a plate which is pivotally suspended below the work table of the power tool. A working tool (e.g., a circular saw blade) is mounted on the rotor shaft of the motor. The plate with the motor mounted thereon is selectively pivotal with respect to the work table by means of a screw linkage such that the plate, together with the tool, may be selectively adjusted with respect to the table such that the tool is either perpendicular to the work table or is at a desired bevel angle with respect to the work table. Additionally, the motor is pivotally mounted on the plate for arcuate movement with respect to the plate. An elevation adjustment screw linkage is provided for effecting arcuate movement of the motor with respect to the plate, which in turn effects changes in elevation of the tool with respect to the work table, regardless of its bevel angle with respect to the work table.

8 Claims, 6 Drawing Figures

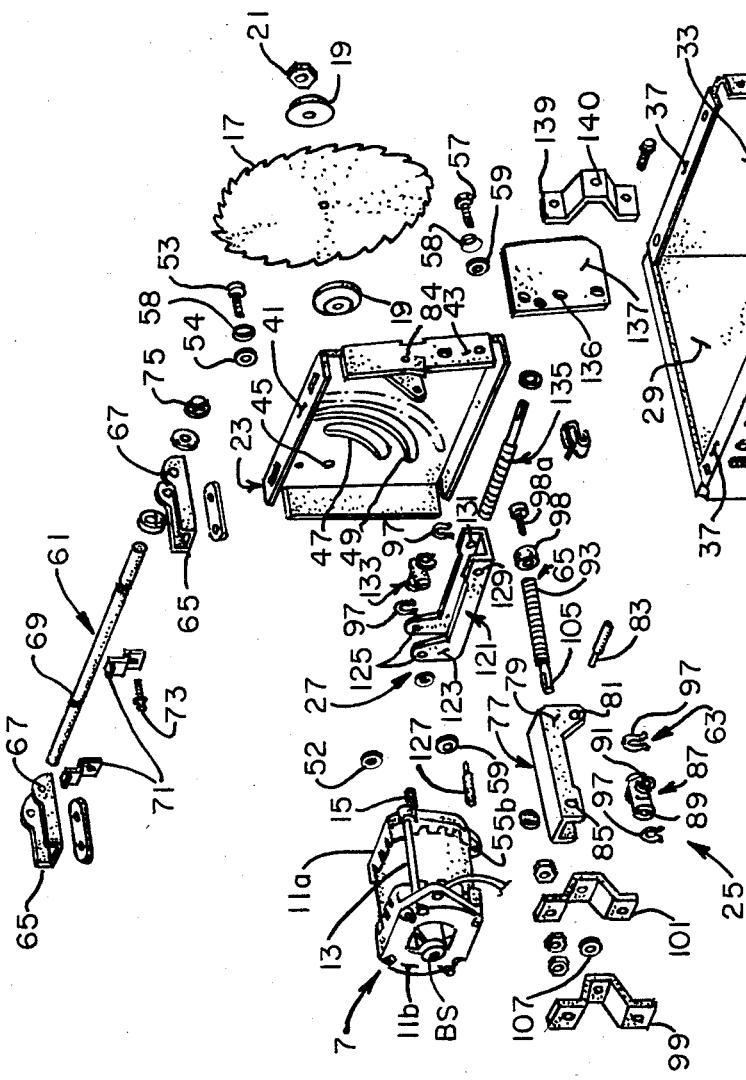
FIG. 4.
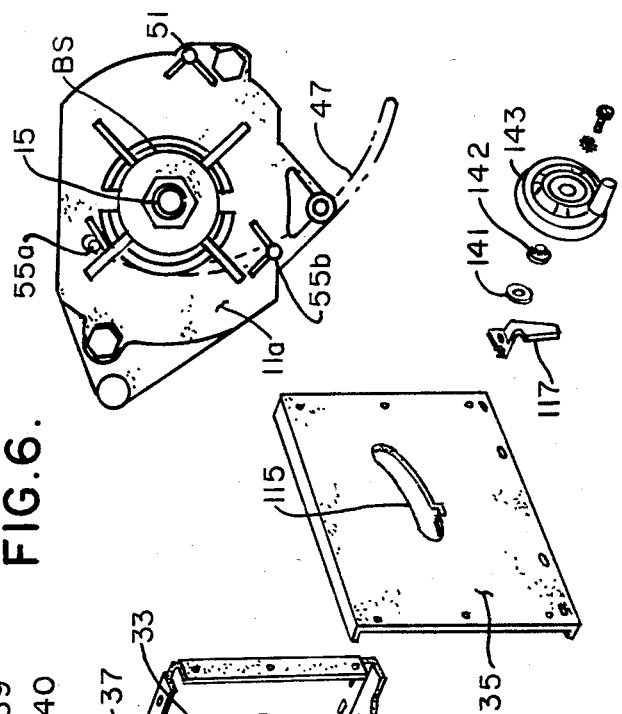
FIG. 5.
FIG. 6.

TOOL ELEVATION AND BEVEL ADJUSTMENT FOR DIRECT DRIVE POWER TOOL

BACKGROUND OF THE INVENTION

This invention relates to a tool elevation and bevel adjustment for a direct drive power tool, and more particularly to such an elevation and bevel adjustment for a direct drive table saw.

In a direct drive table saw, it is typically a requirement of the saw that the operator be readily able to raise and lower (i.e., elevate) the circular saw blade relative to the work surface of the work table so that the depth of cut or the thickness of the wood being cut may be varied. Additionally, it is often necessary to make bevel cuts (i.e., cuts other than cuts made when the blade is perpendicular with respect to the work table) with the plane of the saw blade positioned at a predetermined bevel angle with respect to the work table. These bevel cuts generally range between a perpendicular blade position (referred to as zero degrees) and a 45 degree bevel angle blade position with respect to the work table. In a direct drive table saw, the provision of both a blade elevation and a blade bevel adjustment has required that not only the blade, but also the motor to which the blade is affixed, must be moved or rotated to change the blade elevation and bevel.

SUMMARY OF THE INVENTION

Among the several features and objects of the present invention may be noted the provision of an elevation and bevel adjustment mechanism for a direct drive power tool which is easy to operate by the tool operator, and which permits smooth and accurate adjustments to the elevation and bevel angle of the tool with respect to the work table surface substantially without backlash (i.e., wobble) of the tool;

The provision of such a tool adjustment mechanism which rigidly holds the tool in any adjusted position for assuring accurate and true cuts during operation of the power tool;

The provision of such an adjustment mechanism which permits adjustment of the saw blade, both in elevation and in bevel angle within a limited range, as defined by stops at the end of the adjustment range, the tool being positively engageable with a stop at the end of its adjustment range thereby to accurately position the blade relative to its stops without applying undue binding stresses on the adjustment mechanism; and The provision of such an adjustment arrangement which is of rugged construction, which is relatively of simple construction and assembly, which is reliable in operation, which will not bind, which does not require undue maintenance, and which has a long service life.

Other objects and features of this invention will be in part apparent and in part pointed out hereinafter.

Briefly stated, in a direct drive power tool (e.g., a direct drive table saw), the latter has a work table and a base supporting the work table. An electric motor including a rotor shaft and a tool secured to and rotatable by the rotor shaft is also provided. Specifically, the present invention relates to means carried by the work table for mounting the motor thereon and for being adjustably inclined with respect to the table for varying the bevel angle of the tool, and means for selectively adjusting the elevation of the motor and the tool carried by the rotor shaft of the motor relative to the mounting means and the table. This mounting means comprises a cradle plate below the table, with the cradle plate having a pivot aperture therein. The motor is pivotally mounted on the cradle plate for pivotal movement about the pivot aperture. An arcuate slot is provided in the cradle plate generally concentric with the pivot aperture, this slot receiving the rotor shaft with the latter being generally perpendicular to the cradle plate and protruding through the arcuate slot in the cradle plate. The elevation adjustment means comprises a manually adjustable elevation drive screw for effecting pivotal movement of the motor about the pivot aperture thereby to elevate the rotor shaft toward and away from the table. The elevation drive screw comprises a channel-shaped link having an inner end pivotally secured to the motor at a point distal from the mounting of the motor with respect to the pivot aperture. An elongate drive screw is disposed within the channel-shaped link and is journaled in an abutment carried by the cradle plate. The drive screw extends through the abutment, and means is provided for transferring thrust between the drive screw and the abutment. A handle is mounted on the screw for manually rotating the drive screw. A trunnion nut is threadably engageable with the drive screw and is pivotally secured with respect to the link for permitting relative pivotal movement between the drive screw and the link about an axis generally perpendicular with respect to the drive screw. The link has a pair of trunnion openings therein and the trunnion nut comprises first and second trunnion parts, each of which has an inner surface having threads therein engageable with the drive screw, and an outer surface including a trunnion received in a respective trunnion opening in the link. Means is provided for securing the trunnion parts together generally in inner surface-to-inner surface abutting relation, such that the threads of the trunnion parts threadably engage the drive screw. The tool bevel angle adjustment means comprises means for pivotally mounting the cradle plate about a pivot axis generally parallel to the work surface of the work table. Selectively operable means is provided for effecting pivotal movement of the cradle plate and the motor mounted thereon relative to the work table so as to vary the angle of the tool with respect to the work table.

BRIEF DESCRIPTION OF THE DRAWINGS

FIG. 4 is an exploded perspective view of the primary parts of the power tool constituting the base, the motor, and the mechanisms for tool elevation and bevel adjustment;

FIG. 5 is a plan view in enlarged scale of a trunnion nut interconnecting the elevation or bevel screws to their respective links; and FIG. 6 is a vertical cross sectional view, taken along line 6—6 of FIG. 3.

Corresponding reference characters indicate corresponding parts throughout the several views of the drawings.

DESCRIPTION OF A PREFERRED EMBODIMENT

Figure 1:
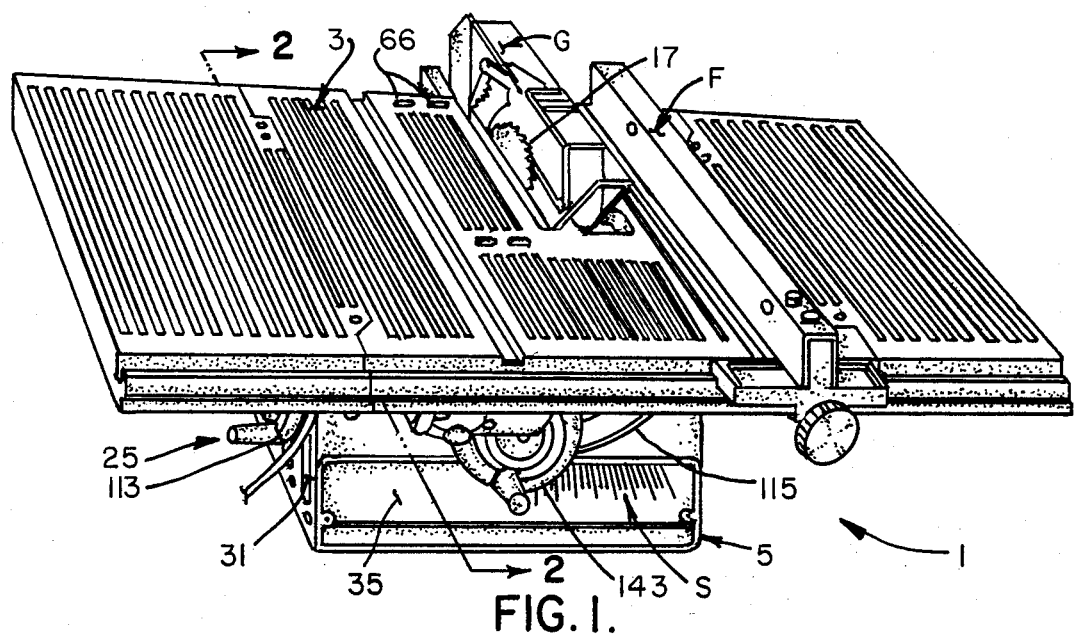
FIG. 1 is a perspective view of a power tool, such as a direct drive table saw, incorporating the tool elevation and bevel angle adjustment apparatus of the present invention.

Referring now to the drawings, this invention relates to a direct drive power tool, and more particularly, to a direct drive table saw, as indicated in its entirety by reference character 1. The table saw includes a work table 3 on which the work to be cut is supported, the work surface WS of the work table constituting a reference plane. As is conventional, a fence F is slidable along at least one edge of the work table to any desired position therealong, and may be locked in place so as to serve as a reference guide for moving the work on the work table. Work table 3 is supported by a base frame or cabinet, as generally indicated at 5, which may either be supported on a work bench or on appropriate work support legs (not shown), such that the work table 3 is at a convenient operating height.

An electric induction motor, as generally indicated at 7, is mounted within base cabinet 5. As is typical, motor 7 has a stator 9 with end shields 11a, 11b mounted at each end of the stator assembly. The end shields are secured to the stator by means of throughbolts 13 extending between the end shields. Optionally, the end shields may be bonded to the stator. The end shields are typically integral die cast members having bearing supports BS therein for journaling the rotor (not shown) of the motor within the stator, the rotor having a rotor shaft 15 journaled by the bearing supports of the end shield, with the rotor shaft extending out beyond one end face of the motor (i.e., out beyond end shield 11a). It will be appreciated that rotor shaft 15 serves as a tool or blade arbor on which a circular saw blade 17 (or other tool) may be mounted such that the blade is directly driven by and rotates with rotor shaft 15. In this manner, the bearings provided in the end shield bearing supports BS of motor 7 serve not only to rotatably support the rotor within the motor, but also serve as the journals for the circular saw blade 17 (or other rotary tool) directly mounted on the rotor shaft 15. Typically, arbor collars 19 are provided on rotor shaft 15 on either side of circular blade 17, and an arbor nut 21 is threaded onto the outer end of rotor shaft 15 so as to securely mount blade 17 on the rotor shaft. A guard G is mounted on the saw so as to enclose saw blade 17 and to protect the operator.

In accordance with this invention, motor 7 is mounted to a so-called cradle plate 23, which in turn is pivotally mounted with respect to work table 3 for pivotal movement about an axis A—A generally parallel with the work surface WS of the work table for changing the bevel angle of the blade with respect to the work surface of the work table by a bevel angle adjustment means, as generally indicated at 25. Additionally, means, as generally indicated at 27, is provided for raising and lowering (i.e., elevating) blade 17 relative to the work surface WS of work table 3.

Figure 3:
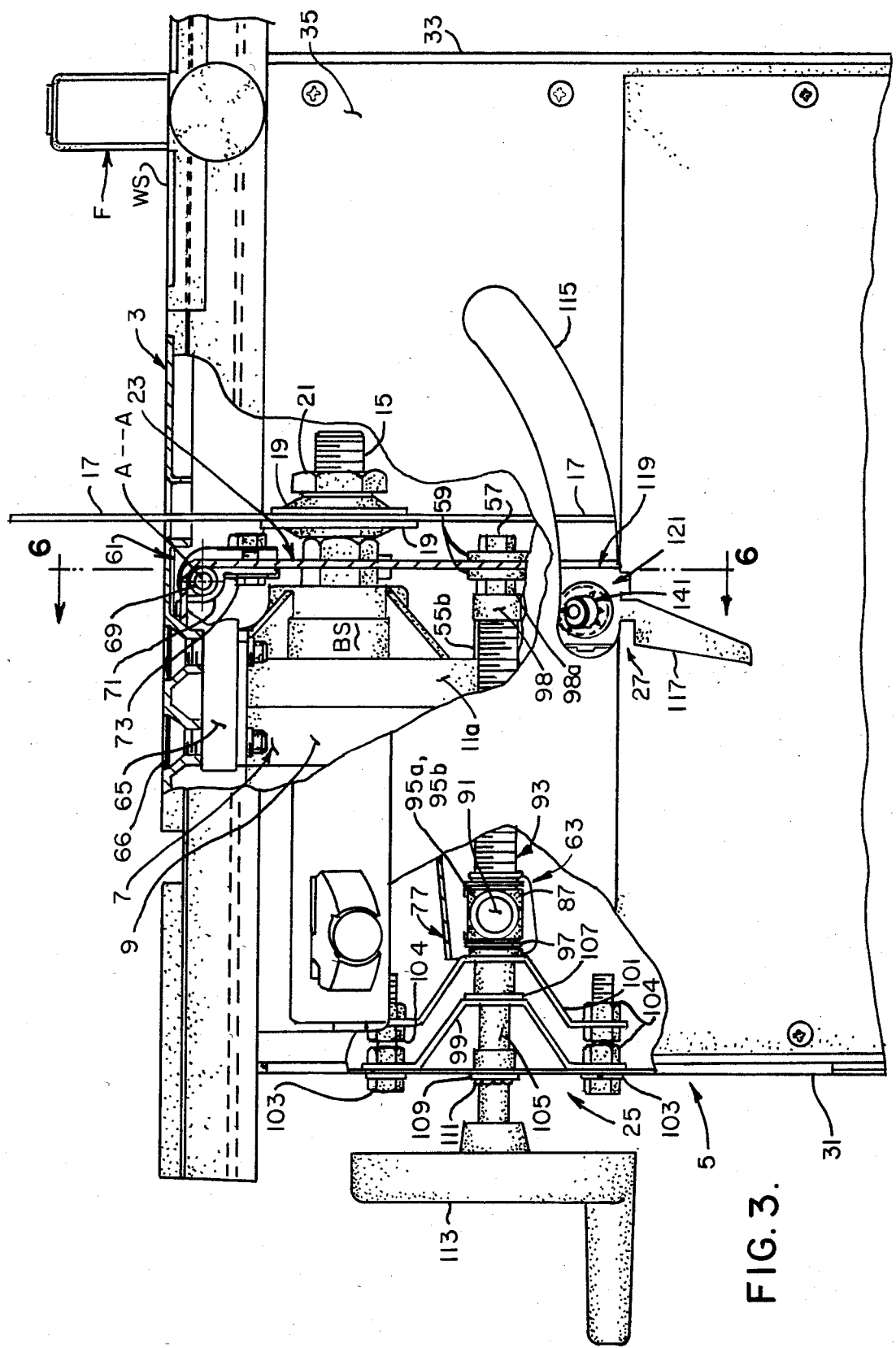
FIG. 3 is a front elevational view of the saw, as shown in FIG. 1, with parts broken away, illustrating the saw blade projecting above the work surface of the work table, and further illustrating an adjustable screw drive interconnected between the tool base and the pivotal cradle plate for selectively, pivotally moving the cradle plate with respect to the work table thereby to vary the angle of the saw blade (i.e., bevel) with respect to the work table.

More generally, base cabinet 5 comprises a back panel 29, a left side panel 31 (as shown in FIGS. 3 and 4), a right side panel 33, and a front panel 35. Upper flanges 37 are provided on the left and right side panels 31 and 33, respectively, to which work table 3 is securely mounted by means of bolts 39 (see FIG. 4). The lower edges of the side panels may be secured to a work bench or to a work stand.

The cradle plate 23 is shown to have an upper flange 41 spaced generally below work table 3 (see FIG. 3), and a front flange 43. The cradle plate is provided with a pivot aperture 45 located generally in the upper rear portion of the plate (as viewed in FIG. 4). An arcuate arbor slot 47, generally concentric with pivot aperture 45, is provided in the cradle plate, with this arbor slot extending through an arc of approximately 65 degrees. Further, another arcuate slot, referred to as a guide slot 49, is provided in cradle plate 23, with the guide slot being generally concentric with pivot aperture 45, the guide slot being located radially outwardly from arbor slot 47.

End shield 11a of motor 7 has a pivot mounting boss 51 extending endwise therefrom. A slide washer 52 of suitable synthetic resin material (e.g., nylon) is disposed between the end of mounting boss 51 and the inner face of cradle plate 23 proximate pivot aperture 45. A pivot bolt 53 is inserted through pivot aperture 45 and engages threads (not shown) within pivot mounting boss 51 thereby to pivotally mount motor 7 with respect to cradle plate 23 for pivoting the motor about pivot bolt 53 received in pivot aperture 45. Another slide washer 54, preferably steel for electrical grounding, is mounted on bolt 53 on the other side of plate 23.

As best shown in FIG. 6, end shield 11a has guide bosses 55a and 55b which are generally proximate guide slot 49 in cradle plate 23 when the motor 7 is pivotally mounted with respect to pivot aperture 45. Guide bolts 57 are inserted through pivot guide slot 49, and are received in guide bosses 55a and 55b. Synthetic resin slide washers 59 are disposed on opposite sides of the cradle plate between bosses 55a and 55b and bolts 57 so as to permit arcuate sliding action between the motor and the portions of the cradle plate defining guide slot 49. As can be appreciated, rotor shaft 15 extends out through arcuate rotor slot 47, and the rotor shaft is adapted to have blade 17 mounted thereon in the manner heretofore described on the side of cradle plate 23 opposite motor 7.

More specifically, bevel angle adjustment means 25, as heretofore described, includes means, as generally indicated at 61, for pivotally mounting cradle plate 23 with respect to work table 3. Further, the bevel adjustment means 25 includes means, as indicated at 63, for adjustably pivoting cradle plate 23 about axis A—A, such that motor 7 mounted on the cradle plate, and circular saw blade 17 carried by rotor shaft 15, pivots about axis A—A and such that blade 17 assumes a desired beveled angle with respect to the work surface WS of work table 3.

More specifically, pivotal mounting means 61 comprises a pair of brackets 65 secured to the underside of work table 3 by means of flathead screws 66. Each of these brackets includes a so-called shaft aperture 67 which receives a cradle rod 69. Clips 71 are bolted to cradle plate 23 by means of clip bolts 73 which securely mount the cradle plate on the cradle rod 69 such that the cradle rod is positively held in position between the clips and the juncture of cradle plate 23 and upper flange 41. This ensures that cradle plate 23 is positively secured to rod 69 in such manner that the cradle plate is parallel to rod axis A—A. A friction slide nut 75 is installed on the front end of shaft 69 (i.e., the righthand end of the shaft, as viewed in FIG. 2), so as to positively secure the pivot shaft to the brackets 65 mounted to work table 3.

Bevel adjustment means 63 comprises an adjustable screw actuator mechanism, including a channel-shaped link bracket, as indicated generally at 77. A clevis 79 is formed on the inner end of the link bracket 77, with the link bracket having two clevis openings 81 formed therein. These clevis openings receive a clevis pin 83, which in turn is secured to a clevis pin opening 84 in the front flange 43 of cradle plate 23 thereby to pivotally attach the cradle plate 23 to link bracket 77.

Further, link bracket 77 has a pair of trunnion openings 85 in its end opposite clevis 79. A trunnion nut, as generally indicated at 87, is disposed within the channel-shaped link bracket proximate trunnion openings 85. The trunnion nut 87 has a threaded opening 89 extending centrally therethrough, and a pair of trunnions 91 extending laterally outwardly, with the trunnions being received in trunnion openings 85 in link bracket 77 such that trunnion nut 87 is pivotally secured with respect to link bracket 77, but such that the trunnion nut is free to rotate about trunnions 91. A bevel actuator screw 93 is received within threaded opening 89 of trunnion nut 87.

More specifically, trunnion nut 87 is a two-part piece, preferably molded of a suitable synthetic resin material, such as nylon. The nut parts 95a, 95b are essentially identical, with each trunnion part having a respective trunnion 91 formed on its side, and having an inner threaded surface which, when assembled, forms threaded opening 89. The trunnion parts 95a, 95b are secured together by means of spring clips 97 at the front and rear ends of the trunnion nut. A bevel adjustment stop is provided on the end of bevel actuator screw 93, this stop comprising a sleeve 98 of a suitable synthetic resin material of equal or larger diameter than the major diameter of the threads on bevel actuator screw 93, with this sleeve 98 being engageable with the inner end of trunnion nut 87 thereby to positively stop rotation of cradle plate 23 on cradle rod 69 at one end of the range of pivotal movement of the cradle plate at a bevel angle of blade 17 with respect to table 3 of approximately 45 degrees. As shown in FIGS. 3 and 4, stop sleeve 98 is secured in place on the end of bevel drive screw 93 by means of a stop bolt 98a threaded into the end of the actuator screw 93.

Bevel actuator screw 93 is journaled with respect to base cabinet 5, and more particularly, with respect to left side panel 31 by means of an inner bracket 99 and an outer flanged bearing 109, as best shown in FIG. 3. This bracket is rigidly secured to left side panel 31 by means of bolts 103. Jam nuts 104 secure the brackets to the bolts. The bearing 109 is secured in the left side panel 31 by means of an interference fit between the bearing and the receiving hole in the left side panel. More particularly, screw 93 includes a necked-down portion 105 proximate inner bracket 99, with a thrust washer 107 interposed between the shoulder between necked-down portion 105 and the body of the bevel adjustment screw thereby to resist outward axial thrust loads transmitted through screw 93 and transferring them to side panel 31. Additionally, flanged bearing 109 is provided on the outer surface of side plate 31, and a friction nut 111 is secured to the neck-down portion 105 of acuator screw 93 so as to transmit inward axial thrust loads from the actuator screw to side panel 31. In this manner, actuator screw 93 is journaled in bracket 99 and flanged bearing 109 in side panel 31 in such manner that both inward and outward axial thrust loads are effectively transferred from the actuator screw to base cabinet 5. A hand wheel 113 is secured to the outer end of screw 93 to facilitate manual turning of screw 93. An arcuate slot, as indicated at 115, is provided in front panel 35 for accommodating blade elevation means 27, which is also carried by cradle plate 23 as the cradle plate is pivoted about axis A—A by actuator screw 93. An indicator 117 is carried by means 27 so as to register with a scale S (see FIG. 1) carried by the front panel thereby to indicate the bevel angle of saw blade 17.

In operation, the bevel angle of saw blade 17 may be varied from a perpendicular position, as shown in FIG. 3, to an angled or a beveled position (not shown) in which the plane of saw blade 17 forms a non-perpendicular angle with the work surface WS of work table 3 thereby to cut a workpiece (not shown) at a bevel. Generally, the bevel angle of saw blade 17 may be selectively varied within a limited range (e.g., between 0 degrees, in which it is perpendicular to work table 3, and 45 degrees). It will be appreciated that the inner face of bracket 101 constitutes a stop engageable with trunnion nut 87 (as shown in FIG. 3) when saw blade 17 is generally in its perpendicular position and is adjustable by moving jam nuts 104 axially along screws 103. Upon counterclockwise operation of actuator screw 93, cradle plate 23 will be pivoted in counterclockwise direction about shaft 69 (as viewed in FIG. 3) to form a desired bevel angle between the saw blade and the work table. Upon stop sleeve 98 coming into engagement with the end of trunnion nut 87, further pivoting of cover plate 23 is prevented. It will be understood that since motor 7 is rigidly connected to and is carried by cradle plate 23, pivoting of the cradle plate also effects pivoting of the motor and the saw blade carried thereby.

Referring now to means 27 for raising and lowering (i.e., elevating) blade 17 with respect to work surface WS of work table 3, this means is shown to include means, as generally indicated at 119, for pivoting motor 7 about pivot bolt 53 pivotally mounted on cradle plate 23 for effecting raising and lowering of the motor relative to the work table. More specifically, means 119 comprises a channel-shaped link 121 having a clevis 123 formed at its inner end, with a pair of clevis holes 125 on opposite sides of the clevis. These clevis holes pivotally receive a clevis pin 127 which is secured to bracket 55 on end shield 11a of motor 7. The outer end of clevis pin 127 is secured relative to clevis 123 by means of a friction nut (not shown). Another clevis 129 is formed on the outer end of link 121, and a pair of clevis or trunnion openings 131 are formed on opposite sides of clevis 129. A trunnion nut, as generally indicated at 133, is provided within channel-shaped link 121. Trunion nut 133 is generally similar to trunnion nut 87 heretofore described, having trunnions 91, which extend out from both sides thereof and which are received in trunnion openings 131. The threaded opening 89 of trunnion nut 133 receives an elevation actuating screw, as indicated at 135, which is threadably received by the threaded opening within trunnion nut 133, and which passes through an opening 136 in a baffle plate 137, which in turn is bolted to flange 43 of cradle plate 23. A bracket 139 is also bolted to baffle plate 137, with this bracket having an opening 140 for receiving the outer, unthreaded end portion of elevation drive screw 135. A thrust washer 141 surrounds the outer end of bevel actuating screw 135, and is in slidable engagement with the outer face of abutment bracket 139. A friction nut 142, secured to the outer end of bevel actuating drive screw 135, secures thrust washer 141 in place and transfers axial thrust loads from the actuator drive screw to abutment bracket 139. A hand wheel 143 is secured to the outer end of the bevel actuating drive screw thereby to permit the ready manual adjustment of the elevation drive screw.

Figure 2:
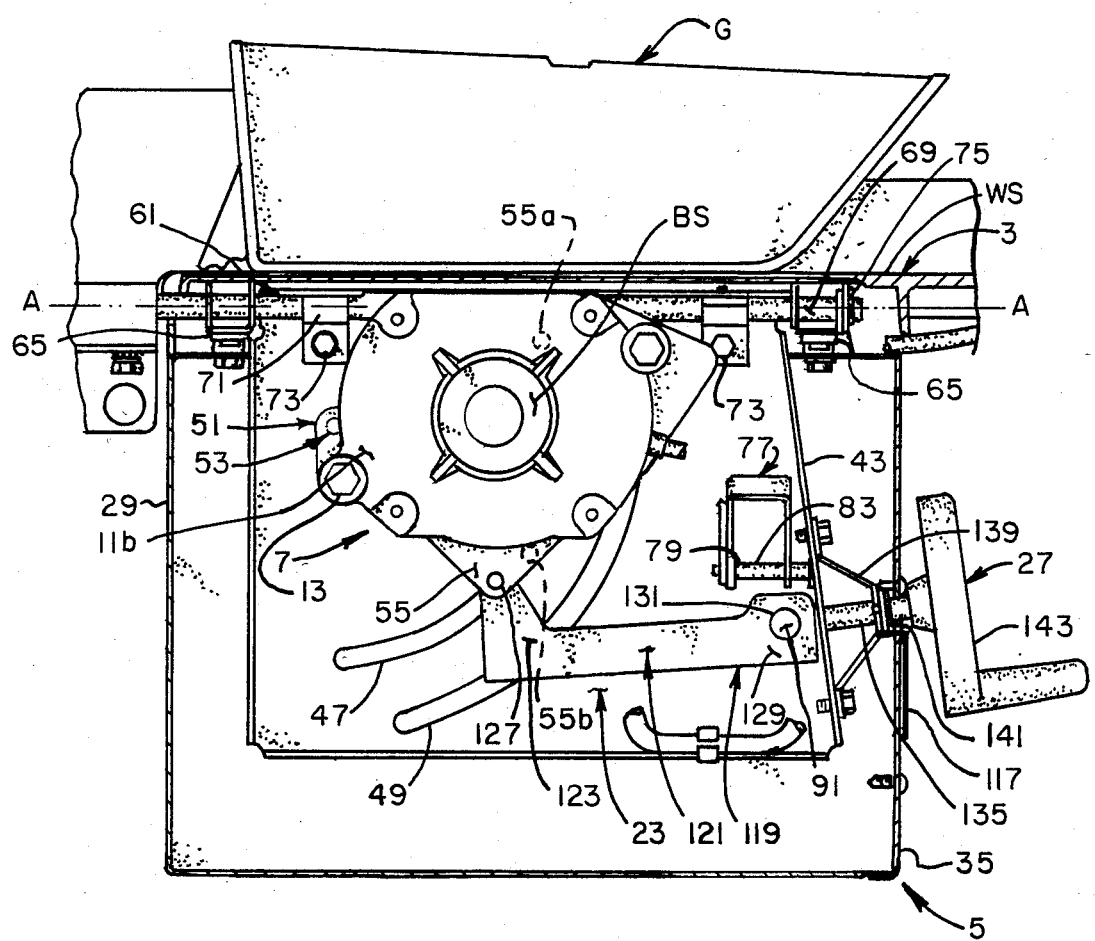
FIG. 2 is a vertical section line, taken along line 2—2 of FIG. 1, illustrating on an enlarged scale a cradle plate pivotally mounted with respect to the work table of the saw, and a direct drive motor (with parts thereof broken away) pivotally mounted on the cradle plate, with a screw linkage arrangement interconnected between the motor and the cradle plate for effecting arcuate pivotal movement of the motor with respect to the cradle plate tHereby to elevate the saw blade relative to the work table.

In operation, upon turning hand wheel 143 in counterclockwise direction, elevation actuating screw 135 drives trunnion nut 133 away from front flange 43 of cradle plate 23, and thus causes motor 7 to rotate in clockwise direction (as shown in FIG. 2) about pivot bolt 53 securing the motor to cradle plate 23, thus also effecting counterclockwise rotation of rotor shaft 15 within slot 47 thereby to effect lowering of blade 17 with respect to work surface WS of work table 3. Likewise, by rotating hand wheel 143 in clockwise direction, link 121 is drawn toward flange 43, thus effecting counterclockwise pivotal movement of the motor on pivot bolt 53, and effecting raising of the blade with respect to the work surface.

It will be appreciated that the entire elevating mechanism 27 is carried by cradle plate 23 and thus pivots with the cradle plate as the latter is pivotally moved by bevel adjustment means 27 as the cradle plate pivots on cradle rod 69. The slot 115 in front panel 35 permits the outer end portion of elevation actuating screw 135 to extend out through the front face of the front panel, and to pivotally move with the cradle plate as bevel adjustment of blade 17 is accomplished. It will be further appreciated that the elevatin and bevel adjustment mechanisms of the present invention have little or no backlash (or other mechanical wobble) and thus fixedly support saw blade 17 in any desired bevel or elevation adjustment position such that saw 1 is capable of making accurate cuts.

In view of the above, it will be seen that the other objects of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

What is claimed is:

1. In a direct drive power tool having a table, a base supporting said table, an electric motor including a rotor shaft, and a tool secured to and rotatable with said rotor shaft, wherein the improvement comprises: means carried by said table for mounting said motor thereto and means for selectively adjusting the elevation of said motor and said tool carried by said rotor shaft relative to said table, said mounting means comprising a cradle plate secured to the bottom of said table, said cradle plate having a pivot aperture therein, said motor being pivotally mounted on said cradle plate for pivotal movement of said motor relative to said cradle plate about said pivot aperture, said elevation adjustment means comprising a manually adjustable elevation screw drive for effecting said pivotal movement of said motor about said pivot aperture thereby to elevate said rotor shaft carrying said tool toward and away from said table, a link having its inner end pivotally secured to said motor at a point distal from the mounting of said motor with respect to said pivotal aperture, an abutment carried by said cradle plate, said elevation drive screw extending through said abutment, means for transferring thrust loads between said elevation drive screw and said abutment, a handle for manually rotating said elevation drive screw, and a trunnion nut threadably engageable with said elevation drive screw and being pivotally secured with respect to said link for permitting relative pivotal movement between said elevation drive screw and said link about an axis generally perpendicular with respect to the axis of said elevation drive screw, said link having a pair of spaced trunnion openings therein for receiving portions of said trunnion nut, said trunnion nut comprising first and second trunnion parts, each of said trunnion parts having an inner surface having threads therein engageable with said elevation drive screw, and an outer surface including a trunnion received in a respective said trunnion opening in a respective said trunnion opening in said link, and means for securing said trunnion parts together such that the threads on said inner surfaces of said trunnion parts threadably engage said elevation drive screw.

2. In a power tool as set forth in claim 1 further comprising a rod carried by said table, said rod having an axis generally parallel to said table, said cradle plate having a flange, said rod being secured to the juncture of said flange and said cradle plate for ensuring that the plane of said cradle plate is substantially parallel to said rod axis.

3. In a direct drive power tool having a work table, a base supporting said table, an electric motor including a rotor shaft, and a tool secured to and rotatable with said rotor shaft, wherein the improvement comprises: means carried by said work table for mounting said motor thereon and means for selectively adjusting the elevation of said motor and said tool carried by said rotor shaft relative to said work table, said mounting means comprising a cradle plate secured to the bottom of said table, said cradle plate having a pivot aperture therein, said motor being pivotally mounted on said cradle plate so as to effect pivotal movement of said motor about said pivot aperture, said elevation adjustment means comprising a manually adjustable elevation screw drive for effecting pivotal movement of said motor about said pivot aperture thereby to elevate said rotor shaft carrying said tool toward and away from said work table, a channel-shaped link having its inner end pivotally secured to said motor at a point distal from the mounting of said motor with respect to said pivotal aperture, an abutment carried by said cradle plate, said elevation drive screw extending through said abutment, means for transferring thrust loads between said elevation drive screw and said abutment, a handle for manually rotating said elevation drive screw, and an elevation trunnion nut threadably engageable with said elevation drive screw and being pivotally secured with respect to said link for permitting relative pivotal movement between said drive screw and said link about an axis generally perpendicular with respect to the axis of said elevation drive screw, said improvement further comprising means for the selective adjustment of the bevel angle of said tool with respect to said work table, said tool bevel angle adjustment means comprising means for pivotally mounting said cradle plate with respect to said table for pivotal movement about a pivot axis generally parallel to said table, and selectively operable means for effecting pivotal movement of said cradle plate and said motor mounted thereon for varying the bevel angle of said tool with respect to said table.

4. In a power tool as set forth in claim 3 wherein said cradle plate and motor pivot means comprises a bevel link pivotally secured to said cradle plate at a location on said cradle plate distal from said pivot axis, an elongate bevel screw, a bevel trunnion nut threadably engageable with said bevel screw and pivotally attached to said bevel link, means mounting said bevel screw relative to said work table for rotation of said bevel screw and for resisting axial thrust loads, said bevel screw having a handle for the manual rotation thereof.

5. In a power tool as set forth in claim 4 wherein said bevel link is a channel-shaped member and has a pair of trunnion openings therethrough, said bevel trunnion nut comprising first and second trunnion parts, each of said trunnion parts having an inner surface having threads therein engageable with said bevel screw, and an outer surface including a trunnion received in a respective trunnion opening in said bevel link, and means for securing said trunnion parts together such that the threads on the inner surfaces of said trunnion parts threadably engage said bevel screw.

6. In a power tool as set forth in claim 4 wherein said bevel screw has means thereon engageable with said bevel trunnion nut for stopping pivoting of said cradle plate at a predetermined bevel angle of said tool with respect to said work table.

7. In a power tool as set forth in claim 6 wherein said stop comprises a sleeve of synthetic resin material generally coaxial with respect to said bevel screw, said sleeve being fixedly held at a predetermined position on said bevel screw, and being engageable with said bevel trunnion nut.

8. A direct drive table saw having a work table, a base cabinet secured to said work table, said base cabinet having a side panel and a front panel, a cradle plate pivotally secured to said work table for pivoting movement between a generally perpendicular position with respect to said work table and a bevel position in which said cradle plate is inclined with respect to said work table, an electric motor carried by said cradle plate, said motor having a rotor shaft extending out beyond one end thereof, said motor being pivotally secured with respect to said cradle plate, said cradle plate having an arcuate slot generally concentric with respect to said pivotal securement of said motor to said cradle plate, said slot receiving said rotor shaft, said rotor shaft having a work tool secured thereto with said work tool being directly driven by said motor, means for selectively, adjustably pivoting said cradle plate and said motor carried thereby to vary the inclination of said cradle plate with respect to said work table and thereby to selectively varying the bevel angle of said tool with respect to said work table, and means carried by said cradle plate for selectively effecting pivotal movement of said motor on said cradle plate thereby to selectively raise and lower said tool with respect to said work table.

* * * * *